United States Patent
Benkreira et al.

(10) Patent No.: US 11,272,330 B1
(45) Date of Patent: Mar. 8, 2022

(54) METHODS AND SYSTEMS FOR FACILITATING DIGITAL NOTIFICATIONS IN MOBILE COMMUNICATION NETWORKS

(71) Applicant: Capital One Services, LLC, McLean, VA (US)

(72) Inventors: Abdelkader Benkreira, McLean, VA (US); Michael Mossoba, McLean, VA (US); Joshua Edwards, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/112,214

(22) Filed: Dec. 4, 2020

(51) Int. Cl.
| | |
|---|---|
| *H04W 4/14* | (2009.01) |
| *H04L 29/08* | (2006.01) |
| *H04W 4/029* | (2018.01) |
| *H04L 67/104* | (2022.01) |

(52) U.S. Cl.
CPC ............ *H04W 4/14* (2013.01); *H04L 67/104* (2013.01); *H04W 4/029* (2018.02)

(58) Field of Classification Search
CPC ....... H04W 4/02; H04W 4/029; H04W 4/027; H04W 4/12; H04W 4/50; H04W 4/021; H04W 64/003; H04W 8/10; H04W 4/14; H04L 51/38; H04L 51/14; H04L 51/20; H04L 67/104
See application file for complete search history.

(56) References Cited

U.S. PATENT DOCUMENTS

| | | | | |
|---|---|---|---|---|
| 7,249,159 | B1 * | 7/2007 | Horvitz ................ | G06Q 10/00 709/206 |
| 8,260,314 | B2 * | 9/2012 | Schroeder ............ | H04W 4/50 455/456.1 |
| 9,420,062 | B2 * | 8/2016 | Vijay .................... | H04L 51/20 |
| 10,243,906 | B2 * | 3/2019 | Park ..................... | H04L 51/24 |
| 2003/0117994 | A1 * | 6/2003 | Fujii ..................... | G04R 20/18 370/349 |
| 2006/0003766 | A1 * | 1/2006 | Parameswar .......... | H04W 4/02 455/433 |
| 2006/0252438 | A1 * | 11/2006 | Ansamaa ............... | H04W 4/02 455/503 |
| 2009/0311992 | A1 * | 12/2009 | Jagetiya ............... | H04M 1/7243 455/412.1 |

(Continued)

FOREIGN PATENT DOCUMENTS

EP         2357766 A1 *  8/2011  ............ H04W 4/029

*Primary Examiner* — Matthew C Sams
(74) *Attorney, Agent, or Firm* — Perkins Coie LLP

(57) ABSTRACT

Methods and systems are described herein for identifying a location of a user prior to sending a notification and/or tailoring notification delivery and/or receipts to a determined location of the user. In many contexts, the delivery or receipt time of these notifications is important. For example, the message may include time-sensitive information or may have been targeted based on delivering (or being received at) an optimal time. The system may determine a time zone identifier by recording a user's default or home location based on known account data and establishing a transaction data stream for identifying transactions that are outside of a radius of the default location. Upon detecting transactions outside the default location, the system may update an account of the user with a temporary location. The system may then determine a delay based on this temporary location.

20 Claims, 5 Drawing Sheets

(56) References Cited

U.S. PATENT DOCUMENTS

2011/0130139 A1\* 6/2011 Ali ........................ H04W 4/02
 455/435.1
2011/0201346 A1\* 8/2011 Schroeder ............ H04W 4/029
 455/456.1

\* cited by examiner

METHODS AND SYSTEMS FOR FACILITATING DIGITAL NOTIFICATIONS IN MOBILE COMMUNICATION NETWORKS

FIELD OF THE INVENTION

The invention relates to facilitating digital notifications in mobile communication networks.

BACKGROUND

In recent years, the amount of, and applications that use, interactive content has risen considerably. The ability to access this content while in transit has also increased due to the availability of mobile communication networks and the wide variety of devices that can access that network. Despite the increased accessibility, the use of mobile communication networks does pose a problem for interactive content that is based on, or modified according to, a location of a user and/or the mobile device as the user and/or mobile device may be difficult to determine.

SUMMARY

Methods and systems are described herein for facilitating digital notifications in mobile communication networks. For example, conventional systems transmit millions of digital notifications everyday using email, push notifications, and short message service ("SMS"). In many contexts, the delivery or receipt time of these notifications is important. For example, the message may include time-sensitive information or may have been targeted based on delivering (or being received at) an optimal time.

However, a common pitfall with these notifications is that users (or the device upon which a user receives the notification) may change their location. This may occur when users travel. For example, if a user is normally located at a location in the eastern time zone of the United States, a system may be designed to transmit a text messages at 9 AM EST. However, the user may be in a different location that is in the pacific coast time zone (e.g., traveling for business). Accordingly, if the system transmits the notification at the designed time (i.e., 9 AM EST), the user will receive the message at 6 AM PST (e.g., while sleeping). Accordingly, the notification may not be responded to or may be lost among other message received during the night. However, if the system delays the message this issue may be averted. For example, by delaying the message to 9 AM PST, the user gets the message while awake—improving the likelihood of a successful notification.

Accordingly, methods and systems are described herein for identifying a location of a user prior to sending a notification and/or tailoring notification delivery and/or receipts to a determined location of the user. Due to the need to ensure reliability, conventional means of detecting a location of a user and/or user device may not be suitable. For example, systems that rely solely on location services and/or GPS data collected from mobile devices are susceptible to a user turning these services off. Moreover, users frequently have more than one mobile device linked to their accounts, and some of these devices may be shared among family members.

Additionally or alternatively, conventional mobile notifications systems rely on Short Message Peer-to-Peer Protocol ("SMPP"). SMPP is an open, industry standard protocol designed to provide a flexible data communication interface for the transfer of short message. SMPP is a nearly ubiquitous standard and thus digital notifications in mobile communication networks may require compatibility with these protocols. However, SMPP is designed for instant delivery; therefore, modifying notifications to be deliver at different times based on users moving to different locations must be done using a mechanism within the SMPP instant delivery environment.

To overcome the limitations of conventional systems, the methods and systems retrieve a time zone identifier corresponding to a current location of a mobile device, comparing the first time zone identifier to the second time zone identifier to determine a message delay time for the text message, and storing the message in a message queue for the message delay time. Additionally or alternatively, the system may determine a time zone identifier by recording a user's default or home location based on known account data and establishing a transaction data stream for identifying transactions that are outside of a radius of the default location. Upon detecting transactions outside the default location, the system may update an account of the user with a temporary location. The system may then determine a delay based on this temporary location. Accordingly, the methods and systems described herein overcome the technical problems that would be faced by conventional systems attempting to facilitate digital notifications in mobile communication networks Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
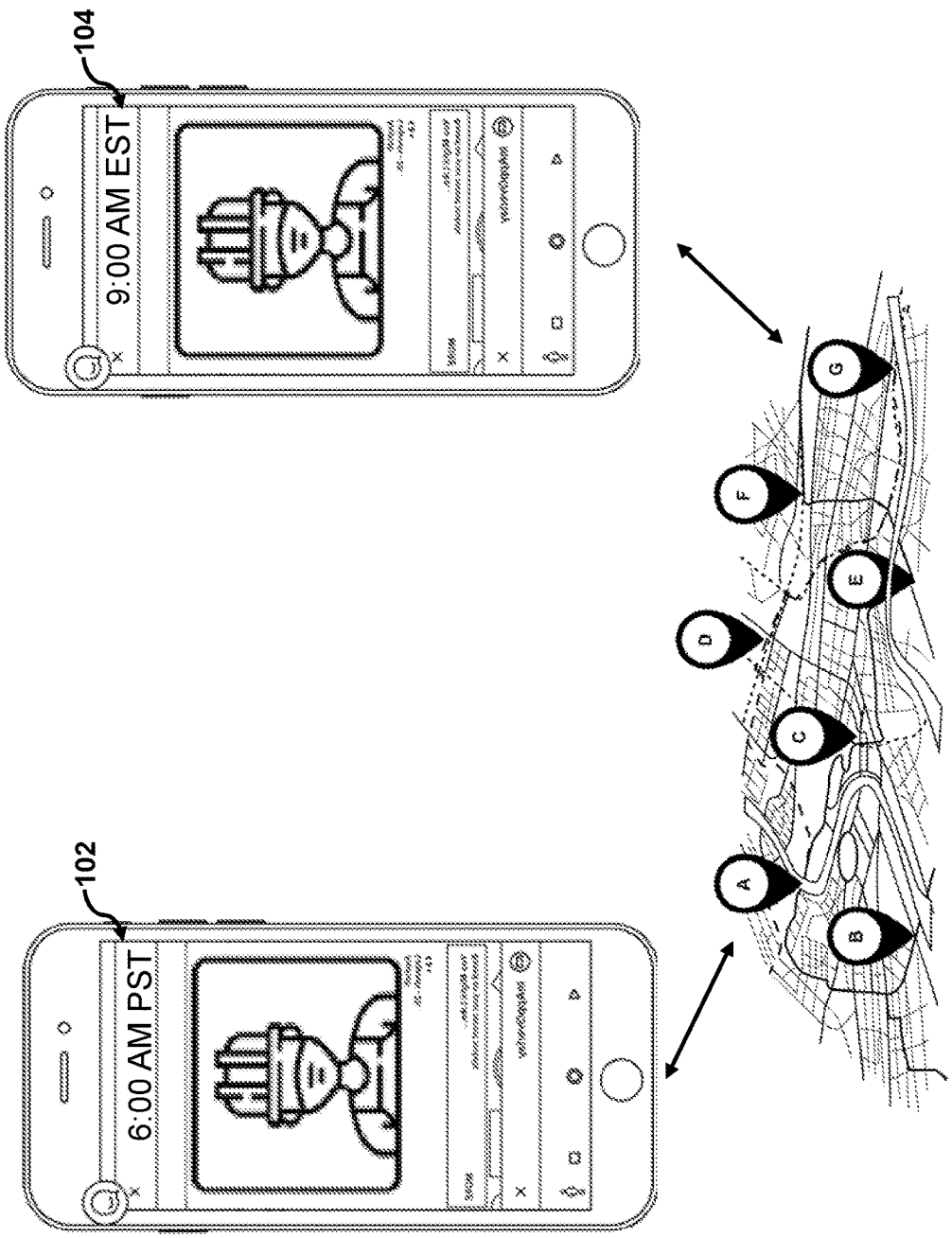
FIG. 1 shows illustrative devices receiving digital notifications with delivery time offsets, in accordance with one or more embodiments.

FIG. 1 shows illustrative devices receiving digital notifications with delivery time offsets, in accordance with one or more embodiments. For example, FIG. 1 includes device 102 and device 104. Device 102 and device 104 may represent the same device, which is receiving the same notification. However, device 104 may represent a situation when a notification is sent to device 104 while device 104 is located in its home location (e.g., geographic region G), whereas device 102 may represent a situation when the notification is sent to device 102 while device 102 is located in a temporary location (e.g., geographic region A).

As referred to herein, a notification or message may comprise any content that notifies and/or informs someone or something. As referred to herein, "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed, or accessed by user equipment devices, but can also be part of a live performance.

The system may determine delivery times (e.g., a time at which a message is delivered) based on the location of a user. A location may refer to a particular place or position. The location may be defined by one or more characteristics that distinguish it from other locations. For example, a location may be defined by global-positioning coordinates ("GPS"), governmentally assigned addresses (e.g., area codes, zip codes, etc.), natural landmarks, Cartesian coordinates indicating distance and direction, etc. Furthermore, as described herein, locations may correspond to additional characteristics. For example, a location may be defined as the "home" location of a user and/or user account. The home location may represent an area in which a user normally resided. A location may also correspond to a "communication" location. A communication location may be the location of a communication which indicates that a user is outside of the home location. A location may also correspond to a "temporary" location. A temporary location may be the location temporarily assigned to a user and/or user account. The system may use a location (e.g., a home or temporary) to determine a time zone and/or delivery time offset for a given notification.

For example, in FIG. 1, user device 104 has received a notification at 9:00 AM EST. This may be a targeted delivery time established by the system (e.g., a delivery time associated with a high rate of receipt and/or acknowledgement success). However, if the user is currently in a different geographic location (e.g., geographic region A), which is in a different time zone, a notification sent at 9:00 AM EST may be received at 6:00 AM PST. For example, if the system transmits the notification at the designed time (i.e., 9 AM EST), the user will receive the message at 6 AM PST (e.g., while sleeping). Accordingly, the notification may not be responded to or may be lost among other message received during the night. However, if the system delays the notification this issue may be averted. For example, by changing the delivery time of the notification to 9 AM PST, the user may receive the notification while awake—improving the likelihood of a successful notification. To change the delivery time, the system may apply a delivery time offset (either positive or negative to the delivery time).

For example, some notification may be required to be sent at specific times and/or prevent from being sent at specific times. The system may therefore ensure that these specific times are met (relative to the local time of the user). For example, the system may apply a positive delivery time offset or a negative delivery time offset based on a temporary location of the user (and/or the local time zone of the temporary location). The system may then maintain the temporary location of the user for a certain time period and/or until certain criteria are met.

For example, the system may maintain a temporary location for a user account until a determined communication location for a subsequent communication corresponds to the home location. In some embodiments, the system may use one or more additional factors or criteria to determine whether or not to maintain or change a temporary location or revert back to a home location to a user and/or user account. For example, the system may first determine a number of communications corresponding to communication locations that do not correspond to the temporary location. The system may then compare the number to a threshold number, and the system may determine a new temporary location (or revert back to the home location) for the first user account based on the communication location based on the number equaling or exceeding the threshold number. In such cases, the system may only assign a new temporary location or revert back to the home location if a certain number of communications have been received from outside the temporary location or in the home location. Additionally or alternatively, the system may first determine a frequency of communications corresponding to communication locations that do not correspond to the temporary location. The system may then compare the frequency to a threshold frequency. The system may then determine the new temporary location (or revert back to the home location) for the first user account based on the communication location based on the frequency equaling or exceeding the threshold frequency. In such cases, the system may only assign a new temporary location if communications have been received from outside the temporary location (or from the home location) at a certain frequency.

Additionally or alternatively, the system may modify the aforementioned factors or criteria based on a number of users that are authorized to perform communications (e.g., credit card transactions). For example, the system may only assign a new temporary location to one user (e.g., a first person of a couple) based on communications (e.g., credit card transactions) being received from a sub-account associated with that user. Likewise, the system may increase or decrease the thresholds discussed above based on the number of users associated with an account. Additionally or alternatively, the system may first determine a communication characteristic based on the metadata (e.g., whether or not the communication was a "card not present" credit card transaction). The system may then compare the communication characteristic to communication characteristics that indicate a user corresponding to the first user account is outside of the home location (e.g., a "card present" credit card transaction, a travel booking transaction, location data, etc.) to determine whether to compare the home location to the communication location.

For example, in some embodiments, a communication may comprise a credit card transaction. A credit card transaction may include metadata that described the transaction. As referred to herein, user record data may include any data related to a transaction. For example, the record data may include a paper or electronic record containing information about the transaction, such as transaction amount, transaction number, transaction date and time, transaction type (deposits, withdrawal, purchase or refund), type of account being debited or credited, card number, identity of the card acceptor (e.g., merchant/source, including source address, identification or serial number, and/or terminal (e.g., name from which the terminal operates)). For example, an exemplary record data for a transaction may include:

Transaction ID: 01234
Timestamp: 1/1/2020 01:30:55 AM UTC
Price: $57.98
Payment Currency: USD
Card Present: True
Merchant ID: 12345

The system may then use this information to determine whether or not a user is in a temporary location. For example, a merchant ID may include a corresponding address (e.g., a geographical address). Additionally, the record data may indicate whether or not a card was present. For example, if a card was present, the record data is indicative of a user being in the location of the communication. However, if the card is not present, the record data is not indicative of a user being in the location of the communication. For example, when a transaction occurs, the point-of-sale terminal may record whether or not the card was present (e.g., swiped, inserted, etc.).

Additionally or alternatively, the system may look for a category associated with the merchant ID. For example, some "card not present" transactions may be used to determine a temporary location of a user (e.g., a travel booking, food delivery order, etc.). The system may use merchant data and compare it to a database (e.g., a white list) to determine this. Additionally, alternative information may also be used. For example, a merchant name or ID that includes certain characters (e.g., "DD*") may correspond to an alphanumeric code that indicates a merchant that facilitates remote delivery.

Figure 2:
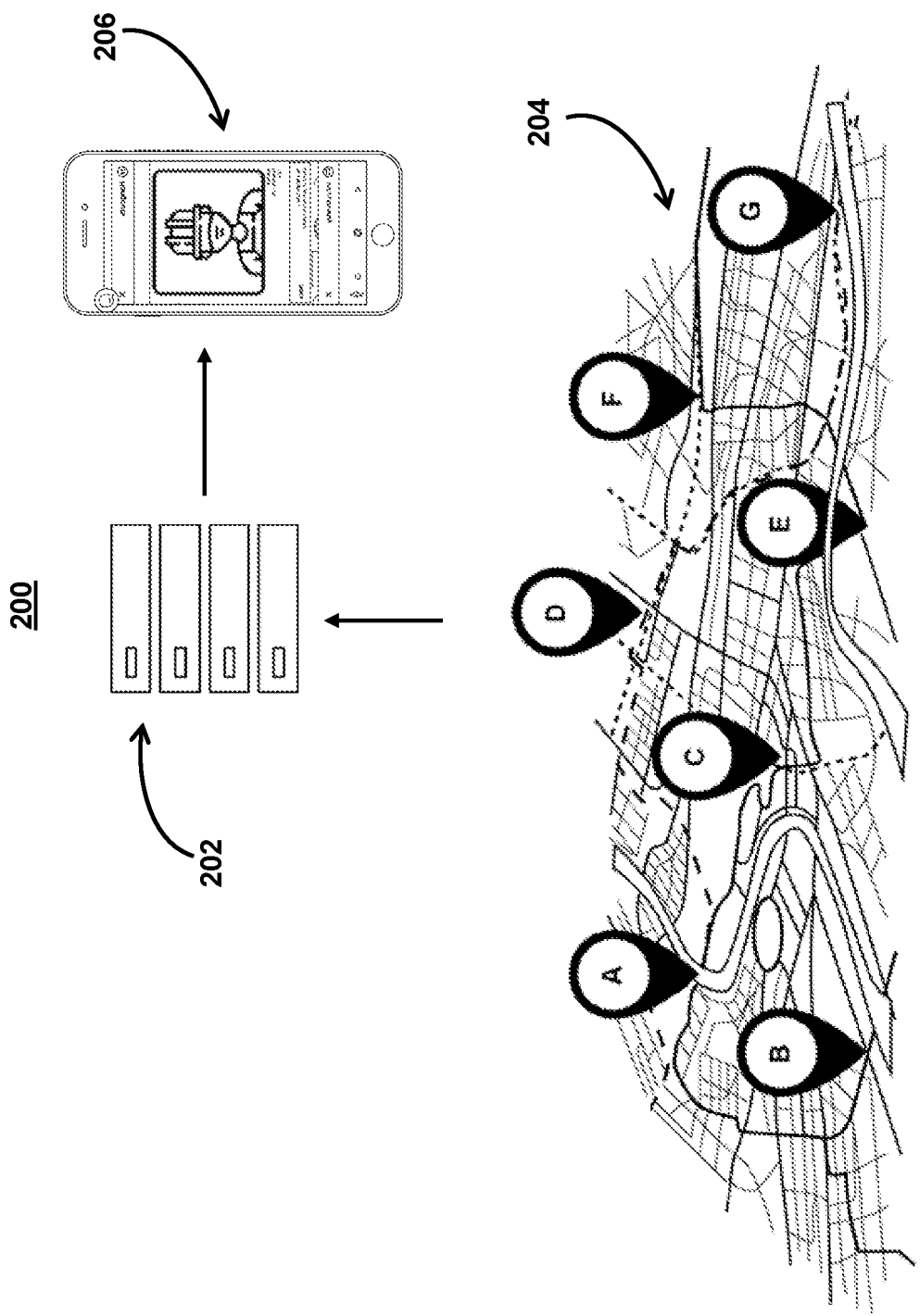
FIG. 2 shows an illustrative system for facilitating digital notifications in mobile communication networks, in accordance with one or more embodiments.

FIG. 2 shows an illustrative system for facilitating digital notifications in mobile communication networks, in accordance with one or more embodiments. For example, system 200 may comprise a system for facilitating digital notifications in mobile communication networks using SMPP. SMPP is an open, industry standard protocol designed to provide a flexible data communication interface for the transfer of short message data between External Short Messaging Entities (ESMEs), Routing Entities (REs) and SMSC. SMPP is often used to allow third parties (e.g. value-added service providers like news organizations) to submit messages, often in bulk, but it may be used for SMS peering as well. SMPP is able to carry short messages including EMS, voicemail notifications, Cell Broadcasts, WAP messages including WAP Push messages (used to deliver MMS notifications), USSD messages and others. Because of its versatility and support for non-GSM SMS protocols, like UMTS, IS-95 (CDMA), CDMA2000, ANSI-136 (TDMA) and iDEN, SMPP is the most commonly used protocol for short message exchange outside SS7 networks.

System 200 may include server 202 that includes storage circuitry configured to store a first user account. Additionally, server 202 may track the movements and/or communications that are indicative of the movement of the user across map 204. For example, server 202 may include control circuitry configured to receive a text message for delivery to the first user account at a time based on a home location of the first user account. The home location of the first user account may correspond to geographic area A of map 204. Prior to sending the message, the system may retrieve the home location based on account data for the first user account. For example, the system may retrieve a user profile associated with the account that indicates a home location or the presence of the user in a temporary location. The system may base this information on detected communications between the first user account (e.g., credit card transactions) and a second user account (e.g., a merchant accepting a credit card transaction). The system may then determine a communication location based on metadata for the communication. For example, the metadata for the communication (e.g., credit card transaction) may indicate a physical address of the merchant.

The system may then compare the home location to the communication location to determine if the two location correspond and/or are in different time zones. In response to determining that the home location does not correspond to the communication location, the system may then determine a temporary location for the first user account based on the communication location. The system may then reference a time zone database. For example, the time zone database may contain code and data that represent the history of local time for many representative locations around the globe. It may be updated periodically to reflect changes made by political bodies to time zone boundaries, UTC offsets, and daylight-saving rules.

The system may retrieve a first time zone identifier corresponding to the home location and retrieve a second time zone identifier corresponding to the temporary location. The system may then compare the first time zone identifier to the second time zone identifier to determine a delivery time offset for the text message. The system may then queue the message in a message queue based on the delivery time offset. The system may then determine a first mobile device (e.g., mobile device 206) corresponding to the first user account based on the account data and use input/output circuitry to transmit the message to a first mobile device.

Figure 3:
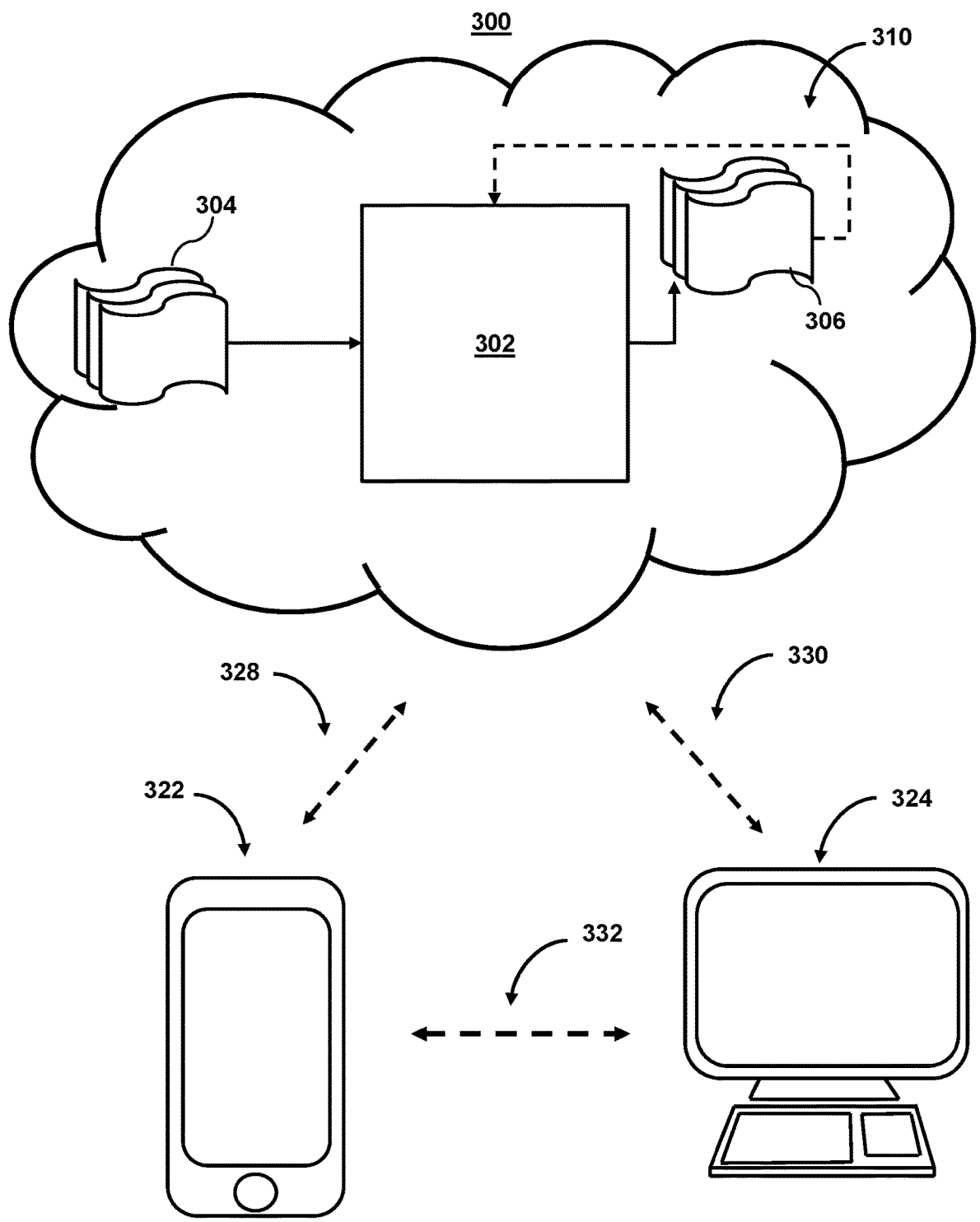
FIG. 3 is an illustrative system for facilitating digital notifications in mobile communication networks in accordance with one or more embodiments.

FIG. 3 is an illustrative system for facilitating digital notifications in mobile communication networks, in accordance with one or more embodiments. For example, system 300 may represent the components used for transmitting notification with delivery time offsets as shown in FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users, may, for instance, utilize one or more devices to interact with one another, one or more servers, or other components of system 300. It should be noted, that, while one or more operations are described herein as being performed by particular components of system 300, those operations may, in some embodiments, be performed by other components of system 300. As an example, while one or more operations are described herein as being performed by components of mobile device 322, those operations, may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., notifications).

Additionally, as mobile device 322 and user terminal 324 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to transmitting notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior transactions. Alternatively, or additionally, the system may act as a clearing house for multiple sources of information about the user. Cloud components 310 may also include control circuitry configured to perform the various operations needed to transmit notifications. For example, the cloud components 310 may include cloud-based storage circuitry configured to store and/or queue notifications. Cloud components 310 may also include cloud-based control circuitry configured to determine a delivery time offset. Cloud components 310 may also include cloud-based input/output circuitry configured to transmit the notification.

Cloud components 310 may include model 302, which may be a machine learning model. Model 302 may take inputs 304 and provide outputs 306. The inputs may include multiple datasets such as a training dataset and a test dataset. Each of the plurality of datasets (e.g., inputs 304) may include data subsets related to user data, delivery time offsets, location data, and results. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known location data and/or a delivery time offset for the first labeled feature input. The system may then train the first machine learning model to classify the first labeled feature input with the known location data and/or a delivery time offset.

In another embodiment, model 302 may update its configurations (e.g., weights, biases, or other parameters) based on the assessment of its prediction (e.g., outputs 306) and reference feedback information (e.g., user indication of accuracy, reference labels, or other information). In another embodiment, where model 302 is a neural network, connection weights may be adjusted to reconcile differences between the neural network's prediction and the reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network (e.g., as described in FIG. 3 below). In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs together. In some embodiments, each connection (or the neural unit itself) may have a threshold function such that the signal must surpass before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302 and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a known location data and/or a delivery time offset).

In some embodiments, model 302 may predict a location data and/or a delivery time offset from a plurality of location data and/or a delivery time offsets stored by the system. For example, the system may determine that particular types of communications are more likely to be indicative of a user traveling outside a home location. In some embodiments, the model (e.g., model 302) may automatically perform actions based on output 306. In some embodiments, the model (e.g., model 302) may not perform any actions on a user's account. The output of the model (e.g., model 302) is only used to decide which location and/or a delivery time offset to select.

Figure 4:
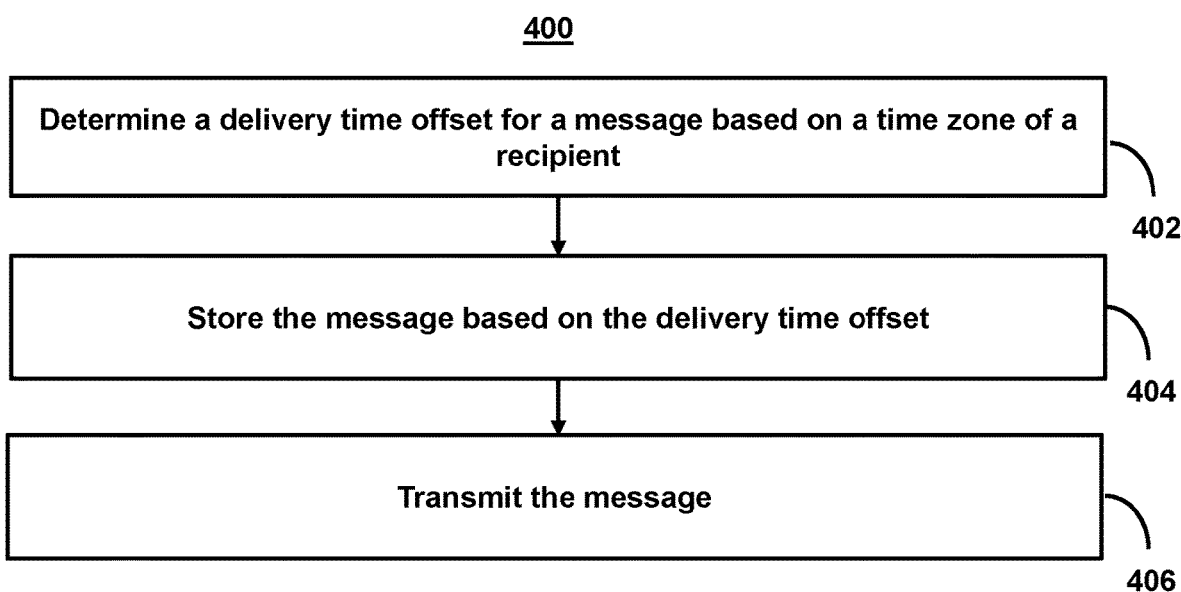
FIG. 4 shows a flowchart of the steps involved in transmitting digital notifications, in accordance with one or more embodiments.

FIG. 4 shows a flowchart of the steps involved in transmitting digital notifications, in accordance with one or more embodiments. For example, process 400 may represent the steps taken by one or more devices as shown in FIGS. 1-3.

At step 402, process 400 (e.g., using one or more components in system 300 (FIG. 3)) determines a delivery time offset for a message based on a time zone of a recipient. For example, the system may receive a message, from a sender, for delivery to a recipient. The system may retrieve a first time zone identifier corresponding to a current location of a mobile device of the recipient and a second time zone identifier corresponding to a current location of a mobile device of the sender. The system may then compare the first time zone identifier to the second time zone identifier to determine a message delay time for the message.

In some embodiments, the system may receive a text message, at a first mobile device (or a server), for delivery to a second mobile device using SMPP. The system may retrieve, at the first mobile device (or server), a first time zone identifier corresponding to a current GPS location of the first mobile device and a second time zone identifier corresponding to a current GPS location of the second mobile device. The system may compare, at the first mobile device, the first time zone identifier to the second time zone identifier to determine a message delay time for the text message.

At step 404, process 400 (e.g., using one or more components in system 300 (FIG. 3)) stores the message based on the delivery time offset. For example, the system may store the message in a message queue for the message delay time. In some embodiments, the system may store the message in a message queue of the first mobile device for the message delay time. For example, the message queue may correspond to a pre-arranged ordering of messages by their respective delivery times. The system may further be configured to automatically transmit the message in the order of the message queue. Alternatively or additionally, the message queue may include a lookup table database in which each message is matched with its respective delivery time.

At step 406, process 400 (e.g., using one or more components in system 300 (FIG. 3)) transmits the message. For example, the system may transmit the message after the message delay. In some embodiments, the system may transmit the message, from the first mobile device to the second mobile device, after the message delay time. For example, the system may transmit the message as the message is reached in the message queue. Alternatively or additionally, the system may compare each delivery time to a clock ticker (e.g., generated from an internal clock function). Upon determining a match between the delivery time (e.g., located in a database listing) and the clock ticker, the system may transmit the message.

In some embodiments, the system may perform a final check prior to transmission. The final check may determine whether or not the scheduled delivery time is still correct. For example, a user has not moved from a temporary location (e.g., as discussed in FIG. 5 below). The system may additionally consciously and/or periodically check delivery times in the message queue and/or the ordering of messages in the queue based on these factors.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one of more of the steps in FIG. 4.

Figure 5:
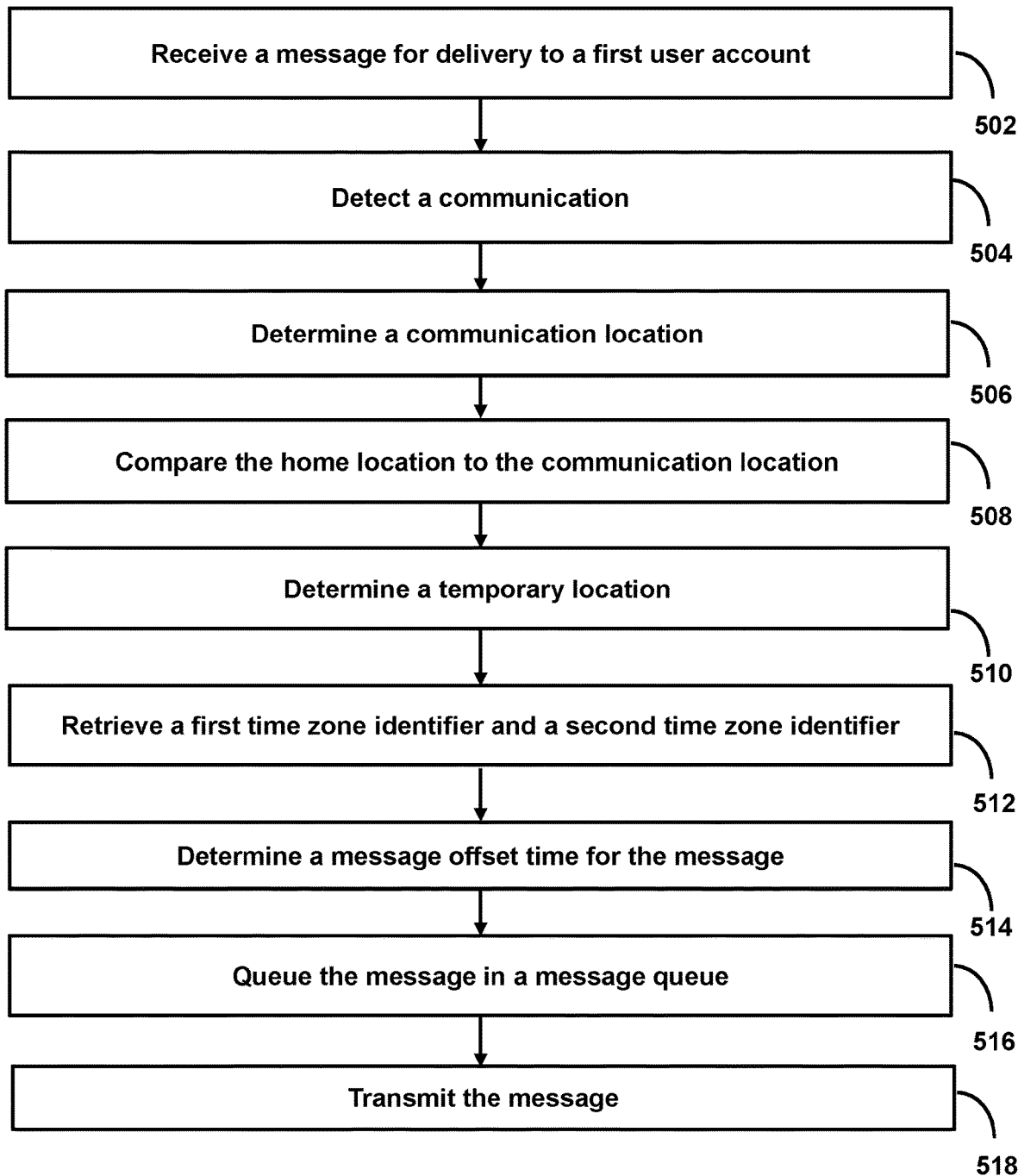
FIG. 5 shows a flowchart of the steps involved in facilitating digital notifications in mobile communication networks, in accordance with one or more embodiments.

FIG. 5 shows a flowchart of the steps involved in facilitating digital notifications in mobile communication networks, in accordance with one or more embodiments. For example, process 500 may represent the steps taken by one or more devices, as shown in FIGS. 1-3, when generating a user information. It should be noted that process 500 may be implemented with various types of communications. For example, in one embodiment, the message may a text message delivered using Short Message Peer-to-Peer Protocol ("SMPP"). In another embodiment, the message may be an email.

At step 502, process 500 (e.g., using one or more components in system 300 (FIG. 3)) receives a message for delivery to a first user account. For example, the system may receive a message for delivery to a first user account, wherein a time of delivery for the message is based on a home location of the first user account. For example, the system may retrieve the home location based on account data for the first user account. The system may then determine a geographic address based on the home location.

In some embodiments, receiving the message for delivery to the first user account may further comprise the system retrieving the message queue, wherein the message queue is for a future time period, and the system identifying the message in the message queue. For example, as opposed to waiting until a message is set to be transmitted, which could risk missing a transmission window, the system may periodically check messages that are to be transmitted in the future (e.g., the next day, week, etc.). In response to detecting a message is to be transmitted, the system may monitor a user and/or determine whether or not a delivery time offset needs to be applied.

At step 504, process 500 (e.g., using one or more components in system 300 (FIG. 3)) detects a communication. For example, the system may detect a communication between the first user account and a second user account. In some embodiments, the system may periodically monitor or continuously monitor for communications related to a user account. Additionally or alternatively, the system may detect trigger events that cause the system to begin monitoring communications. For example, the system may determine whether location data is available from the first mobile device. In response to determining that the location data is not available from the first mobile device, the system may monitor for the communication between the first user account and the second user account.

At step 506, process 500 (e.g., using one or more components in system 300 (FIG. 3)) determines a communication location. For example, the system may determine a communication location based on metadata for the communication. The types of communications and metadata may take various forms. For example, in some embodiments, the communication may be an email communication, and the metadata may comprise an IP address. The system may then determine a communication location that corresponds to a geographical location corresponding to the IP address. In some embodiments, the communication may be an electronic account action (e.g., a credit card transaction) between the first user account and the second user account (e.g., a merchant), and the metadata may comprises location information for the electronic account action (e.g., a merchant address). The system may then determine the communication location that corresponds to a geographical location corresponding to the location information.

At step 508, process 500 (e.g., using one or more components in system 300 (FIG. 3)) compares the home location to the communication location. For example, the system may compare the home location to the communication location. In some embodiments, the system may retrieve geographic coordinates (e.g., global positioning coordinates), geographic designations (e.g., zip codes, addresses, etc.) and compare these to determine whether or not the communication location is within, or within a predetermined radius, from the home location. Alternatively, the system may directly determine time zone information for the home location and the communication location (without first comparing locations). In such cases, comparing the home location to the communication location may comprise comparing the time zones of the two locations.

At step 510, process 500 (e.g., using one or more components in system 300 (FIG. 3)) determine a temporary location. For example, the system may determine a temporary location for the first user account based on the communication location in response to determining that the home location does not correspond to the communication location. In some embodiments, the system may use one or more additional factors or criteria to determine whether or not to assign a temporary location to a user and/or user account. For example, the system may first determine a number of communications corresponding to communication locations that do not correspond to the home location. The system may then compare the number to a threshold number, and the system may determine the temporary location for the first user account based on the communication location based on the number equaling or exceeding the threshold number. In such cases, the system may only assign a temporary location if a certain number of communications have been received from outside the home location. Additionally or alternatively, the system may first determine a frequency of communications corresponding to communication locations that do not correspond to the home location. The system may then compare the frequency to a threshold frequency. The system may then determine the temporary location for the first user account based on the communication location based on the frequency equaling or exceeding the threshold frequency. In such cases, the system may only assign a temporary location if communications have been received from outside the home location at a certain frequency.

Additionally or alternatively, the system may modify the aforementioned factors or criteria based on a number of users that are authorized to perform communications (e.g., credit card transactions). For example, the system may only assign a temporary location to one user (e.g., a first person of a couple) based on communications (e.g., credit card transactions) being received from a sub-account associated with that user. Likewise, the system may increase or decrease the thresholds discussed above based on the number of users associated with an account. Additionally or alternatively, the system may first determine a communication characteristic based on the metadata (e.g., whether or not the communication was a "card not present" credit card transaction). The system may then compare the communication characteristic to communication characteristics that indicate a user corresponding to the first user account is outside of the home location (e.g., a "card present" credit card transaction, a travel booking transaction, location data, etc.) to determine whether to compare the home location to the communication location.

At step 512, process 500 (e.g., using one or more components in system 300 (FIG. 3)) retrieves a first time zone identifier and a second time zone identifier. For example, the system may retrieve a first time zone identifier corresponding to the home location, and the system may retrieve a second time zone identifier corresponding to the temporary location. For example, the system may determine a geographic address based on the home location. The system may then determine the first time zone identifier based on the geographic address.

At step 514, process 500 (e.g., using one or more components in system 300 (FIG. 3)) determines a delivery time offset for the message. For example, the system may compare the first time zone identifier to the second time zone identifier to determine a delivery time offset for the message. For example, the system may retrieve a time zone identifier (e.g., the local time within a time zone as defined by its offset (difference) from Coordinated Universal Time (UTC)) and determine a difference between the time zones for the home location and the temporary/communication location.

At step 516, process 500 (e.g., using one or more components in system 300 (FIG. 3)) queues the message in a message queue. For example, the system may queue the message in a message queue based on the delivery time offset. For example, the system may store the message and update a delivery time for transmitting the message based on the delivery time offset.

At step 518, process 500 (e.g., using one or more components in system 300 (FIG. 3)) transmit the messages. For example, the system may transmit the message to a first mobile device, wherein the first mobile device corresponds to the first user account. For example, the system may send the message at the delivery time as modified by the delivery time offset.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method of sending messages, the method comprising: determining a time delay for a message based on a time zone of the recipient; delaying the message based on the time delay; and sending the message after the delay.

2. A method of facilitating improved communications between users using text messages in mobile devices, the method comprising: receiving a message, from a sender, for delivery to a recipient; retrieving a first time zone identifier corresponding to a current location of a mobile device of the recipient and a second time zone identifier corresponding to a current location of a mobile device of the sender; comparing the first time zone identifier to the second time zone identifier to determine a message delay time for the message; storing the message in a message queue for the message delay time; and transmitting the message after the message delay.

3. A method of facilitating improved communications between users using text messages in mobile devices, the method comprising: receiving a text message, at a first mobile device, for delivery to a second mobile device using SMPP; retrieving, at the first mobile device, a first time zone identifier corresponding to a current GPS location of the first mobile device and a second time zone identifier corresponding to a current GPS location of the second mobile device; comparing, at the first mobile device, the first time zone identifier to the second time zone identifier to determine a message delay time for the text message; storing the message in a message queue of the first mobile device for the message delay time; and transmitting the message, from the first mobile device to the second mobile device, after the message delay time.

4. A method for facilitating digital notifications in mobile communication networks, the method comprising: receiving a message for delivery to a first user account, wherein a time of delivery for the message is based on a home location of the first user account; detecting a communication between the first user account and a second user account; determining a communication location based on metadata for the communication; comparing the home location to the communication location; in response to determining that the home location does not correspond to the communication location, determining a temporary location for the first user account based on the communication location; retrieving a first time zone identifier corresponding to the home location; retrieving a second time zone identifier corresponding to the temporary location; comparing the first time zone identifier to the second time zone identifier to determine a delivery time offset for the text message; queuing the message in a message queue based on the delivery time offset; and transmitting the message to the first mobile device.

5. The method of any one of the preceding embodiments, further comprising: retrieving the home location based on account data for the first user account; determining a geographic address based on the home location; and determining the first time zone identifier based on the geographic address.

6. The method of any one of the preceding embodiments, wherein the communication is an email communication, wherein the metadata comprises an IP address, and wherein the communication location corresponds to a geographical location corresponding to the IP address.

7. The method of any one of the preceding embodiments, wherein the message is a text message delivered using Short Message Peer-to-Peer Protocol ("SMPP").

8. The method of any one of the preceding embodiments, wherein the communication is based on an electronic account action between the first user account and the second user account, wherein the metadata comprises location information for the electronic account action, and wherein the communication location corresponds to a geographical location corresponding to the location information.

9. The method of any one of the preceding embodiments, wherein determining a temporary location for the first user account based on the communication location in response to determining that the home location does not correspond to the communication location further comprises: determining a number of communications corresponding to communication locations that do not correspond to the home location; compare the number to a threshold number; and determining the temporary location for the first user account based on the communication location based on the number equaling or exceeding the threshold number.

10. The method of any one of the preceding embodiments, wherein determining a temporary location for the first user account based on the communication location in response to determining that the home location does not correspond to the communication location further comprises: determining a frequency of communications corresponding to communication locations that do not correspond to the home location; compare the frequency to a threshold frequency; and determining the temporary location for the first user account based on the communication location based on the frequency equaling or exceeding the threshold frequency.

11. The method of any one of the preceding embodiments, further comprising: determining a communication characteristic based on the metadata; and comparing the communication characteristic to communication characteristics that indicate a user corresponding to the first user account is outside of the home location to determine whether to compare the home location to the communication location.

12. The method of any one of the preceding embodiments, wherein receiving the message for delivery to the first user account further comprises retrieving the message queue, wherein the message queue is for a future time period; and identifying the message in the message queue.

13. The method of any one of the preceding embodiments, further comprising: determining whether location data is available from the first mobile device; and in response to determining that the location data is not available from the first mobile device, monitoring for the communication between the first user account and the second user.

14. A tangible, non-transitory, machine-readable medium storing instructions that, when executed by a data processing apparatus, cause the data processing apparatus to perform operations comprising those of any of embodiments 1-13.

15. A system comprising: one or more processors; and memory storing instructions that, when executed by the processors, cause the processors to effectuate operations comprising those of any of embodiments 1-13.

16. A system comprising means for performing any of embodiments 1-13.

What is claimed is:

1. A system for facilitating digital notifications in mobile communication networks using Short Message Peer-to-Peer Protocol ("SMPP"), the system comprising:
   storage circuitry configured to store a first user account;
   control circuitry configured to:
      receive a text message for delivery to the first user account at a time based on a home location of the first user account;
      retrieve the home location based on account data for the first user account;
      detecting a communication between the first user account and a second user account;
      determine a communication location based on metadata for the communication;
      compare the home location to the communication location;
      in response to determining that the home location does not correspond to the communication location, determine a temporary location for the first user account based on the communication location;
      retrieve a first time zone identifier corresponding to the home location;
      retrieve a second time zone identifier corresponding to the temporary location;
      compare the first time zone identifier to the second time zone identifier to determine a delivery time offset for the text message;
      queue the text message in a message queue based on the delivery time offset;
      determine a first mobile device corresponding to the first user account based on the account data; and
   input/output circuitry configured to transmit the text message to a first mobile device.

2. A method for facilitating digital notifications in mobile communication networks, the method comprising:
   receiving, using control circuitry, a message for delivery to a first user account, wherein a time of delivery for the message is based on a home location of the first user account;
   detecting, using the control circuitry, a communication between the first user account and a second user account;
   determining, using the control circuitry, a communication location based on metadata for the communication;
   comparing, using the control circuitry, the home location to the communication location;
   in response to determining that the home location does not correspond to the communication location, determining, using the control circuitry, a temporary location for the first user account based on the communication location;
   retrieving, using the control circuitry, a first time zone identifier corresponding to the home location;
   retrieving, using the control circuitry, a second time zone identifier corresponding to the temporary location;
   comparing, using the control circuitry, the first time zone identifier to the second time zone identifier to determine a delivery time offset for the message;
   queuing, using the control circuitry, the message in a message queue based on the delivery time offset; and
   transmitting, using the control circuitry, the message to a first mobile device, wherein the first mobile device corresponds to the first user account.

3. The method of claim 2, further comprising:
   retrieving the home location based on account data for the first user account;
   determining a geographic address based on the home location; and
   determining the first time zone identifier based on the geographic address.

4. The method of claim 2, wherein the communication is an email communication, wherein the metadata comprises an IP address, and wherein the communication location corresponds to a geographical location corresponding to the IP address.

5. The method of claim 2, wherein the message is a text message delivered using Short Message Peer-to-Peer Protocol ("SMPP").

6. The method of claim 2, wherein the communication is based on an electronic account action between the first user account and the second user account, wherein the metadata comprises location information for the electronic account action, and wherein the communication location corresponds to a geographical location corresponding to the location information.

7. The method of claim 2, wherein determining a temporary location for the first user account based on the communication location in response to determining that the home location does not correspond to the communication location further comprises:
   determining a number of communications corresponding to communication locations that do not correspond to the home location;
   compare the number to a threshold number; and
   determining the temporary location for the first user account based on the communication location based on the number equaling or exceeding the threshold number.

8. The method of claim 2, wherein determining a temporary location for the first user account based on the communication location in response to determining that the home location does not correspond to the communication location further comprises:
   determining a frequency of communications corresponding to communication locations that do not correspond to the home location;

compare the frequency to a threshold frequency; and determining the temporary location for the first user account based on the communication location based on the frequency equaling or exceeding the threshold frequency.

9. The method of claim 2, further comprising:

determining a communication characteristic based on the metadata; and comparing the communication characteristic to communication characteristics that indicate a user corresponding to the first user account is outside of the home location to determine whether to compare the home location to the communication location.

10. The method of claim 2, wherein receiving the message for delivery to the first user account further comprises:

retrieving the message queue, wherein the message queue is for a future time period; and identifying the message in the message queue.

11. The method of claim 2, further comprising determining whether location data is available from the first mobile device; and in response to determining that the location data is not available from the first mobile device, monitoring for the communication between the first user account and the second user account.

12. A non-transitory, computer-readable medium for facilitating digital notifications in mobile communication networks, comprising instructions that, when executed by one or more processors, cause operations comprising:

receiving a message for delivery to a first user account, wherein a time of delivery for the message is based on a home location of the first user account;

detecting a communication between the first user account and a second user account;

determining a communication location based on metadata for the communication;

comparing the home location to the communication location;

in response to determining that the home location does not correspond to the communication location, determining a temporary location for the first user account based on the communication location;

retrieving a first time zone identifier corresponding to the home location;

retrieving a second time zone identifier corresponding to the temporary location;

comparing the first time zone identifier to the second time zone identifier to determine a delivery time offset for the message;

queuing the message in a message queue based on the delivery time offset; and transmitting the message to a first mobile device, wherein the first mobile device corresponds to the first user account.

13. The non-transitory, computer readable medium of claim 12, wherein the instructions further cause operations comprising:

retrieving the home location based on account data for the first user account;

determining a geographic address based on the home location; and determining the first time zone identifier based on the geographic address.

14. The non-transitory, computer readable medium of claim 12, wherein the communication is an email communication, wherein the metadata comprises an IP address, and wherein the communication location corresponds to a geographical location corresponding to the IP address.

15. The non-transitory, computer readable medium of claim 12, wherein the message is a text message delivered using Short Message Peer-to-Peer Protocol ("SMPP").

16. The non-transitory, computer readable medium of claim 12, wherein the communication is based on an electronic account action between the first user account and the second user account, wherein the metadata comprises location information for the electronic account action, and wherein the communication location corresponds to a geographical location corresponding to the location information.

17. The non-transitory, computer readable medium of claim 12, wherein determining the temporary location for the first user account based on the communication location in response to determining that the home location does not correspond to the communication location further comprises:

determining a number of communications corresponding to communication locations that do not correspond to the home location;

compare the number to a threshold number; and determining the temporary location for the first user account based on the communication location based on the number equaling or exceeding the threshold number.

18. The non-transitory, computer readable medium of claim 12, wherein determining the temporary location for the first user account based on the communication location in response to determining that the home location does not correspond to the communication location further comprises:

determining a frequency of communications corresponding to communication locations that do not correspond to the home location;

compare the frequency to a threshold frequency; and determining the temporary location for the first user account based on the communication location based on the frequency equaling or exceeding the threshold frequency.

19. The non-transitory, computer readable medium of claim 12, wherein the instructions further cause operations comprising:

determining a communication characteristic based on the metadata; and comparing the communication characteristic to communication characteristics that indicate a user corresponding to the first user account is outside of the home location to determine whether to compare the home location to the communication location.

20. The non-transitory, computer readable medium of claim 12, wherein receiving the message for delivery to the first user account further comprises:

retrieving the message queue, wherein the message queue is for a future time period; and identifying the message in the message queue.

\* \* \* \* \*